(12) United States Patent
Mann

(10) Patent No.: US 6,440,467 B2
(45) Date of Patent: Aug. 27, 2002

(54) INFUSED VEGETABLE, HERB, AND/OR SEED FIBER PRODUCT AND DIETARY SUPPLEMENTS CONTAINING SAME

(76) Inventor: Douglas G. Mann, 808 Head of the Bay Rd., Buzzards Bay, MA (US) 02532

(*) Notice: Subject to any disclaimer, the term of this patent is extended or adjusted under 35 U.S.C. 154(b) by 0 days.

(21) Appl. No.: 09/789,797

(22) Filed: Feb. 20, 2001

Related U.S. Application Data

(62) Division of application No. 09/303,808, filed on Apr. 30, 1999, now Pat. No. 6,231,866.
(60) Provisional application No. 60/083,566, filed on Apr. 30, 1998.

(51) Int. Cl.[7] .............................................. A61K 35/78
(52) U.S. Cl. ..................... 424/727; 424/725; 424/737; 424/777
(58) Field of Search ................................ 424/725, 777, 424/727, 737

(56) References Cited

U.S. PATENT DOCUMENTS

| | | | |
|---|---|---|---|
| 3,940,505 A | * | 2/1976 | Nappen et al. |
| 4,572,836 A | * | 2/1986 | Bakal |
| 4,631,837 A | * | 12/1986 | Magoon |
| 4,654,222 A | * | 3/1987 | Fuller, Jr. |
| 4,782,747 A | * | 11/1988 | Unger et al. |
| 4,810,517 A | * | 3/1989 | Glittenberg et al. |
| 4,888,187 A | * | 12/1989 | Givens et al. |
| 5,162,128 A | * | 11/1992 | Mills et al. |
| 5,482,711 A | | 1/1996 | Medenica |
| 5,653,981 A | | 8/1997 | Medenica |
| 5,756,141 A | * | 5/1998 | Chen et al. |
| 5,840,354 A | * | 11/1998 | Baumann et al. |
| 6,168,803 B1 | * | 1/2001 | Harris et al. |

OTHER PUBLICATIONS

Ahuja, S. et al, "Loss of Fimbrial Adhesion with the addition of vaccinum macracarpon to the growth medium of P–Fimbriated Escherchia Coli, " The Journal of Urology, 159:559–562 (19989)

Avorn, J. et al, "Reduction of Baccteriuria and Pyuria after ingestino of cranberry juice, " J. Amer. Med. Assoc., 271:751–754 (1994)

Fowler, J.E., "Urinary tract infection in women. " Urologic clinics of North America, 13:4:673–683 (1986)

* cited by examiner

*Primary Examiner*—Christopher R. Tate
(74) *Attorney, Agent, or Firm*—DeWitt Ross & Stevens SC; Charles S. Sara

(57) ABSTRACT

Disclosed is a method of producing a reconstituted fruit, herb, and/or seed fiber product, the product produced using the method, and dietary supplements containing the product. The steps used to produce the product include expressing juice from a fruit, herb, or seed; concentrating the juice by removing water; infusing pomace obtained during expression of the juice with the concentrated juice, and drying the steeped pomace to obtain a dry, non-hygroscopic, free-flowing nutritional supplement.

21 Claims, No Drawings

INFUSED VEGETABLE, HERB, AND/OR SEED FIBER PRODUCT AND DIETARY SUPPLEMENTS CONTAINING SAME

CROSS-REFERENCE TO RELATED APPLICATIONS

This application is a divisional under 35 USC § 120 to application Ser. No. 09/303,808, filed Apr. 30, 1999, now U.S. Pat. No. 6,231,866, which claims priority to provisional patent application Ser. No. 60/083,566, filed Apr. 30, 1998, the entireties of both are incorporated by reference herein.

FIELD OF THE INVENTION

The invention is directed to: (i) a method of producing a reconstituted vegetable, fruit, herb, and/or seed product, the product produced using the method, and dietary supplements containing the product; (ii) other methods which provide all natural solutions for carrying and delivering nutraceutical supplements into the human body; and (iii) a unique cranberry nutraceutical product which can be used effectively to promote and maintain a healthy urinary tract.

DESCRIPTION OF THE PRIOR ART

Currently, powdered forms of cranberries and of many other fruits, produced for use as ingredients, are made from the juice portion of the fruit only. The juice is extracted from the whole fruit by pressing and then concentrating. During this stage, the plant-derived fiber portion, otherwise known as the pomace or marc, of the fruit is discarded, and the natural pectin in the juice is removed. The remainder fruit juice product is then spray dried, using a high-heat drying method to remove most of the moisture, which reduces it to a powder. This final powder ingredient is a substantially-depleted version of the whole fruit plant, bearing little resemblance to the values contained in the complete fruit.

These powdered fruit ingredients, now devoid of many of the important active components and enzymes which synergistically existed in the whole fruit plant, deliver little therapeutic value when incorporated into nutraceutical products.

For example, many of the cranberry dietary supplements sold in the marketplace today indicate a dosage requirement of as many as six to twelve tablets or capsules a day because of the weak efficacy of the powdered cranberry ingredient used.

Thus, there is a distinct need for a new method which will produce new powdered fruit ingredients, and for new cranberry and other fruit powdered compositions, which are not so depleted as described and which instead incorporate all, or even more, of the values contained in the original fruits.

In another respect, powdered fruit ingredients tend to be hygroscopic and easily agglutinatable. This characteristic substantially affects the flow capability of these ingredients when being transferred into capsules or softgels for use as dietary supplements. To overcome this problem, unnatural excipients are currently added to the fruit ingredients in order to facilitate encapsulation. However, the use of these excipients presents further problems of then being able to meet tapped bulk density specifications. Further, for the natural products industry, the use of unnatural excipients is not desired.

Thus there is a distinct need in the marketplace: (i) for a method which will enable the production of powdered fruit ingredients which are non-hygroscopic; (ii) for a method which will improve the flow characteristics of these ingredients sufficiently to eliminate the need to use excipients during encapsulation; and (iii) for an all-natural method of achieving these objectives.

In yet another respect, the objective of nutraceutical dietary supplements is to deliver active compounds into the human body on an efficacious basis. However, many of these supplements after oral ingestion are substantially degraded by stomach acids before they can deliver their payload to the intestine for assimilation into the blood stream. For example, most of the cranberry powdered ingredients being currently employed in dietary supplements dissolve quickly in the stomach and thus have limited bioavailability. While there are various drug delivery systems used in the pharmaceutical industry to increase efficacy, there is an absence of methods available for natural delivery of nutraceutical products.

Thus there is now a clear and compelling need in the marketplace for a method of naturally delivering nutraceutical products effectively into the human body.

In yet another respect, cranberries have a long and well-documented history of being used in the maintenance of urinary tract health. Modern research has shown that cranberry fruit contains compounds which are bacteriostatic and particularly aid in the prevention of urinary tract infections (UTI's). It is believed that this activity is manifested by compounds which limit the ability of bacteria to adhere to surfaces within the urinary tract. Research has shown that at least one of these compounds is similar in activity to the Tamms-Horsfall glycoprotein, a compound which inhibits the adherence of *E. coli* to the bladder wall. See: Avorn, et al., "Reduction of Bacteriuria and Pyuria After Ingestion of Cranberry Juice,"(1994) *J. Amer. Med. Assoc.* 271:751–754; Fowler, "Urinary Tract Infections in Women," *Urol. Clinics of N. Amer.* (1986) 13(4):673–683. A recent study further found that the compounds in cranberry directly affected the cell structure of *E. coli*, and disabled the bacteria so that it was unable to adhere to urothelium and to be less capable of survival. See Ahuja, J., et al., *J. Urol* 1998:159: 559–562.

Based on the known effects of cranberry juice in the maintenance of urinary tract health, many people now include cranberry juice as part of their regular diets. However, most commercially-available cranberry juice cocktails contain large amounts of added sugar and colorants, additives which many health-conscious individuals find objectionable. Diabetics, for example, often find the sugar content of commercially-prepared cranberry juice cocktails to be so high as to offset any benefits provided by the juice itself.

As a consequence, there has been a long-felt need for a dietary supplement which: (i) provides the proven health benefits of cranberry juice without the disadvantages inherent in the cranberry juice concoctions which are currently offered in the market place; and (ii) is powerful enough to only require one tablet a day as the recommended daily dosage to be effective.

And yet in another respect, many other fruits, vegetables, herbs, and seeds in addition to cranberries have been scientifically shown or are widely believed through apocryphal evidence, to have other beneficial health effects. For example, bilberries and blueberries are reported to reduce macular nerve degeneration and to improve eyesight. Saw palmetto has been found to reduce prostate swelling. St. John's Wort is believed by many to have antidepressant activity. Garlic is thought to have antibacterial activity. Ginkgo biloba is believed to improve memory, and ginseng is believed to improve attentiveness. Additionally, extracts of *Nigella sativa* have been shown scientifically to inhibit the growth and proliferation of certain cancers and to increase immune function. See U.S. Pat. Nos. 5,482,711 and 5,653,981 to *Medenica*. Various natural ingredients have been ascribed to act as aphrodisiacs.

In their natural forms, most of these fruits, vegetables, herbs, and seeds cannot be directly ingested (due to palatability as well as other concerns). Many of the extracts produced from them have only captured a portion of the bioactive compounds. There is thus a distinct need for a new processing method which can capture the full synergistic and beneficial activity of these plants in a palatable concoction which retains the beneficial activity of the natural forms, and also provides for easy transport, easy formulation into unit dosages, and long-term shelf life without the need for refrigeration.

And in a final respect, tea has been used for centuries as both a beverage and an herbal remedy. The cranberry teas in the market are flavored beverages. There is a distinct need in the marketplace for a method to make a nutraceutical cranberry tea.

SUMMARY OF THE INVENTION

This invention relates to a method of naturally reconstituting a whole plant to make a powdered nutritional pharmacological ingredient from the plant which is far richer in vitamins, anthocyanins, proanthocyanins, antioxidants and other components on a concentrated basis than are otherwise naturally proportionately present in the plant.

In another respect, the invention pertains to an all natural method for producing powdered ingredients which are non-hygroscopic and which have enhanced flow characteristics without the use of unnatural excipients.

In yet another respect, the invention concerns an all natural unique method of orally delivering nutraceutical compositions into the human body in such a manner that the bioactive compounds contained therein are more effectively absorbed and utilized in the human body.

In yet another respect, the invention pertains to a cranberry-based nutraceutical composition containing active components which inhibit the adhesion of bacteria to surfaces in the urinary tract and which assists in the promotion and maintenance of a healthy urinary tract.

In yet another respect, the invention pertains to a method for producing a cranberry-based nutraceutical tea.

In yet another respect, the invention pertains to a method of producing a highly concentrated, unpurified dietary fiber product derived from plants.

A first embodiment of the invention is directed to a dietary supplement produced by infusing plant-derived fiber with juice concentrate derived from the same or different plant and drying the infused fibers. The term "plant-derived fiber" is also sometimes referred to in this and other publications as "pomace," "marc," and "press cake." For purposes of this application, the plant-derived fiber portion will be referred to as pomace.

In a first step, juice is expressed from plant material of fruits, vegetables, herbs, spices, etc. (hereinafter referred to collectively as plants) and seeds of plants, thereby yielding a juice portion and a pomace portion. The juice portion is concentrated to yield a juice concentrate, and the juice concentrate is then infused with the pomace portion, whereby the concentrate is absorbed into the pomace. The pomace so treated is then dried and milled and optionally tableted or capsulated.

A second embodiment of the invention is directed to a dietary supplement alternatively produced by infusing pomace with oil or other extract derived from the same or a different plant and drying the infused fibers. In a first step, the oil or other extract is expressed from plant material of plants, thereby yielding an oil or extract portion and a pomace portion. The oil or extract portion is then infused with the pomace portion, whereby the oil or extract is absorbed into the pomace. The pomace so treated is then dried and milled, and optionally tableted capsulated.

A third embodiment of the invention is directed to a highly concentrated, unpurified nutritional dietary fiber product produced from pomace derived from the same or different plant and made into a powdered form. In a first step, juice is expressed from plants, thereby yielding a juice or oil portion and a pomace portion. The juice or oil portion is discarded. The pomace is then dried, optionally blended with a gum or other water-soluble fiber, and milled.

A fourth embodiment of the invention is drawn to the product produced using the process described immediately above.

The invention is an edible 100% plant matter composition which can be used as a nutritional ingredient in place and instead of other highly concentrated, unpurified fiber products such as bran, gum or psyllium-seed husk. It can also be presented in unit dosage form to promote and maintain a healthy life. In the case where cranberries are utilized as the plant material source, the composition is a cranberry fiber, product containing some of the bioactive values of cranberries.

The preferred composition comprises cranberry pomace, which is dried and blended with a gum or alternatively another water-soluble plant fiber and then milled to a roughly uniform size, and optionally formed into tablets or capsules, in the absence of any colorants, sweeteners, unnatural binders, excipients or any other accessory ingredient.

The composition has the same non-hygroscopic and flow features as described above in the second embodiment of the invention. In short, this composition is also comprised entirely of plant-derived fiber.

The composition is manufactured by first removing from the plant matter all plant-derived juice, oil or other liquid extract during a pressing operation. The pomace is then dried, optionally blended with a gum or other water-soluble fiber, milled and shipped in bulk. The composition makes an excellent natural nutritional ingredient and can be used as a food additive for fortification of fiber bars, cereals, breads, drinks and the like, or it can be optionally pelleted, tableted or capsulated for use as dietary supplement to be orally ingested.

The preferred plant fiber for use in this embodiment of the invention is the pomace taken directly from the presses used to express the juice, oil or other liquid extract from the plant material.

However, it is within the scope of the invention to mix the pomaces and juices. For example, there may be value in infusing the concentrated juice of cranberries into the pomace derived from apples, blueberries, carrots, squash or other plants. The pomace need not be dried prior to its use in the invention.

In use, the composition, capsulated or not, is ingested orally as a dietary supplement to promote the general health of the user. The composition can also be used as a food additive for fortification of fiber bars, cereals, breads, and drinks.

In addition to its clear health benefits, another distinct advantage of the present invention is that it that it utilizes plant-derived pomace, which would otherwise be discarded as waste. For example, when cranberry juice concentrate is added to the cranberry pomace, the resulting reconstituted cranberry product makes an excellent nutritional supplement which does not require nutritionally insignificant excipients such as sweeteners, desiccants, binding agents, and the like.

Further benefits of the present invention are manifest. By reconstituting concentrated juice with the natural fibers, the nutritionally- and pharmacologically-active ingredients present in the vegetable, fruit, herb, or seed are concentrated in comparison to their concentrations as found in nature. Consequently, the bioactive compounds found naturally in the plants are fortified. Also, on a per weight basis, the resultant product is far richer in beneficial vitamins, anthocyanins, proanthocyanins, antioxidants, and other beneficial components.

Moreover, the process and the resultant product utilize the entire natural source, including the vegetable, fruit, skin, seeds, and fibrous portions thereof, and not simply an extract of the natural plant source.

In essence, the process yields a powdered version of an entire vegetable, fruit, herb, or seed. The resultant product contains the complete complement (juice, skin, seeds, fiber) of the source vegetable matter, not just the juice portion. By utilizing only low-temperature processing, the resultant product preserves the natural enzyme activities found in the fresh vegetable, fruit, herb or seed. In its preferred form, the process does not require any unnatural substances; hence the finished product does not contain any unnatural substances. However, it is within the scope of the present invention to add other ingredients if desired.

Additionally, the final product is capable of being finely milled and can therefore easily be formulated into any number of unit dosage forms, such as tablets or capsules. The product need not be refrigerated and is storage stable for at least a period of months, if not years. This makes formulation, storage, and transport of the product extremely attractive.

When formulated into unit dosages, such as tablets or capsules, the product of the invention is easily delivered orally. Because the bioactive ingredients are infused into a generally fiber matrix, the bioactive components are shielded from degradation during transit through the stomach, thereby delivering a maximum concentration of bioactive ingredients in the intestines. The natural pectin components of the product slow down the digestive process in the intestines and provide a natural sustained release of the active compounds from the fiber matrix, thereby enhancing the bioavailability of the active compounds. The insoluble fiber portion, while indigestible, serves as a bulking agent to promote regularity and good intestinal health and functioning.

Virtually any plant material, including whole plants, whole fruits, whole vegetables, spices, herbs, seeds, skin, bark, leaves, roots, tubers, or parts thereof, may be used in the present invention. It is preferred that an entire fruit or vegetable or an entire plant be used, although this is not required. The preferred plant materials to be utilized in the invention fall into two categories: Category I: whole cranberries, blueberries, bilberries, aronia and raspberries; and Category II: *Nigella sativa*, saw palmetto, alfalfa, and Echinacea. Preferably, each of these materials is formulated separately to yield a powdered product derived from a single plant source. However, if desired, mixtures of various plant materials may be commingled and processed simultaneously.

Further advantages of the invention will appear from a complete reading of the Detailed Description, below.

DETAILED DESCRIPTION OF THE INVENTION

The discussion which follows is limited to a description of the particular, preferred formulation of the present invention,-which is a dried formulation derived from whole cranberries. This limitation, however, is for brevity only. As noted above, virtually any plant material, including whole plants, whole fruits, whole vegetables, spices, herbs, seeds, skin, bark, leaves, roots, tubers, or parts thereof, may be used in the present invention. It is preferred that an entire fruit or vegetable or an entire plant be used, although this is not required. The preferred plant materials to be utilized in the invention fall into two categories: Category I: whole cranberries, blueberries, bilberries, aronia and raspberries; and Category II: *Nigelli saliva*, saw palmetto, alfalfa, and Echinacea, with the most preferred being cranberries. The process as described below for cranberries is the same process which is used when processing any plants set forth in Category I or similar.

The dietary supplement disclosed herein which is formulated from cranberries has been given the name CRAN-MAX, which term shall be used to designate the product described hereinbelow.

CRAN-MAX is produced by infusing cranberry juice concentrate into cranberry pomace from which the juice has already been expressed. By removing the juice from the pomace, concentrating the juice, and then reuniting the juice with the pomace, a dietary supplement which is far richer in vitamins, anthocyanins and proanthocyanins (OPC's), antioxidants, and other compounds found naturally in cranberries (but in far reduced concentrations) is produced. CRAN-MAX can be taken in pill or capsule form to afford an individual the known benefits of cranberry without ingesting unwanted additives such as sweeteners and colorants found in commercially available cranberry concoctions.

The first step in producing CRAN-MAX is to express juice from cranberries. This is accomplished by any of several means known to the art. The physical maceration and expression of juice from the fibrous matrix of plant material has been known for millennia. Juice from fresh cranberries is expressed as soon as practicable after harvest using any type of suitable means for pressing. For small batches, a hand-powered hydraulic basket press is perfectly suitable. For larger volumes of cranberries, industrial-sized equipment is required. Any debris is removed from the juice by filtration. It is preferred that the juice be processed immediately after expression or promptly frozen for storage until further processing is undertaken. Likewise, the pomace is either used promptly or frozen until needed.

Fresh, single-strength cranberry juice generally has a concentration of about 5–7 brix, depending upon the source and condition of the fruit. For use in the formulation of CRAN-MAX, the single-strength juice is concentrated to at least about 50 brix or higher. This can be done by any means known in the art, such as reduced-pressure evaporation, conventional dehydration, and the like. Preferably the concentration of the cranberry juice concentrate falls between about 50 and about 65 brix.

The pomace can be used directly or promptly frozen for storage until further processing is undertaken. The pomace is then dried prior to being mixed with the juice concentrate.

The juice concentrate and the pomace are preferably mixed at a ratio ranging from between about 1:1 (juice concentrate to pomace) to 1:4 (wt/wt) based upon a 50 brix juice concentrate and the calculated dry weight of the pomace. See Example 3, below for a 1:1 formulation of CRAN-MAX starting from 50 brix juice concentrate.

The pomace and concentrated juice are then combined in a batching vessel along with an amount of guar gum for binding purposes. Additional nutritional and/or nutraceutical substances from the group consisting of vitamins, minerals, herbs, and the like, may be added during the mixing stage. The ratio of juice concentrate to pomace is established prior to the addition of any further ingredients.

The juice and pomace and any additives are mixed thoroughly to ensure that the entire bulk of the pomace is contacted by the concentrated juice. Preferably, this mixing is done at a temperature between about 40° F. and 75° F. The mixture is allowed to steep for up to 24 hours to allow the liquid to be fully absorbed into the pomace.

The pomace/concentrate mixture is then dried. This can be done on drying racks in a conventional dehydrator or by vacuum drying means, or by any other means for drying known to the art of food and pharmaceutical processing. Low-temperature drying means (not to exceed about 140° F.) are greatly preferred. It is preferred that the moisture content of the dried mixture be no more than about 3% by weight.

The dried product so derived using cranberries as the starting plant material is called CRAN-MAX. The CRAN-MAX is then milled to a uniform size if desired. Generally, milling to a mesh size of between about 50 and about 80 yields a product which readily flows and can easily be packaged, transported, and formulated into dosage form (if desired). A 50–80 mesh CRAN-MAX powder is easily pelletized or capsulated using suitable and conventional machinery.

CRAN-MAX powder is non-hygroscopic and therefore does not require the use of desiccants. It should also be noted here that the product similarly produced from another plant source is also non-hygroscopic and does not require the use of desiccants.

The composition described herein, whether from cranberries or another plant source, either alone or in combination with other nutritionally significant compounds can be used in the formulation of dietary supplements, nutraceuticals, or pharmaceutical compositions for nutritional and/or medical use. Nutraceuticals are foods that have specific medicinal as well as nutritional benefits. The composition may be optionally formulated with an acceptable carrier therefor and optionally other therapeutically active ingredients. The carrier, if one is utilized, must be pharmaceutically acceptable in the sense of being compatible with the other ingredients of the formulation and not deleterious to the recipient thereof.

The formulations are suitable for oral administration only.

The formulations may conveniently be presented in unit dosage form and may be prepared by any of the methods well known in the art of pharmacy. All methods include the step of shaping the product into desired unit dosage form or packaging the product into unit dosages, such as capsules. If a carrier is used, such methods also generally include the steps of bringing the active compound into association with a carrier and one or more optional accessory ingredients. In general, the formulations are prepared by uniformly and intimately bringing the active compound into association with a liquid or solid carrier and then shaping or packaging into discrete unit dosages.

Formulations of the present invention suitable for oral administration may be presented as discrete units such as capsules, cachets, tablets, boluses or lozenges, each containing a predetermined amount of the CRAN-MAX product as a powder or granules or small fibers.

A tablet may be made by compression or molding, optionally with one or more accessory ingredients. Compressed tablets may be prepared by compressing the CRAN-MAX in a suitable machine in a free-flowing form, e.g., a powder or granules, optionally mixed with accessory ingredients, e.g., binders, lubricants, inert diluents, surface active or dispersing agents. Molded tablets may be made by molding in a suitable machine, a mixture of powdered CRAN-MAX with any suitable carrier (optional). The amount of CRAN-MAX present may be in a unitized amount of between about 100 mg to about 500 mg.

The amount of the composition required to be effective for promoting and maintaining sound health, will, of course, vary with the plant material used in the formulation of the composition and the individual mammal being treated and is ultimately at the discretion of the individual, or medical or veterinary practitioner.

In general, the pharmaceutical compositions of this invention contain from about 50 to about 5000 mg of CRAN-MAX, and preferably from about 300 to about 1000 mg. of CRAN-MAX, preferably in a unit dosage form. The recommended dosage of CRAN-MAX is 500 mg a day, preferably in a single dose, which has been determined by laboratory analysis and confirmed by clinical evaluation. See Example 7 below.

CRAN-MAX powder contains more antioxidant activity than straight cranberry juice and has an organic acid content that is comparable to that of commercially-available, single-strength cranberry juice (see the Examples).

Plants in Category 2 referenced above require a different process than that used for plants in Category 1 referenced above. The process described below for saw palmetto is the same process which is used when processing any plants set forth in Category 2, or similar.

The dietary supplement disclosed herein which is formulated from saw palmetto has been given the name SAW-MAX, which term shall be used to designate the product described below.

SAW-MAX is produced by infusing saw palmetto oil into saw palmetto pomace. The saw palmetto oil is obtained from saw palmetto seeds from which the oil has been expressed. By infusing the oil from the seeds into the pomace, a dietary supplement which is far richer in saw palmetto (but in far reduced concentrations) is produced. SAW-MAX can be taken in pill or capsule form to afford an individual the known benefits of saw palmetto in a more potent form.

The first step in producing SAW-MAX is to dry the saw palmetto berries (containing seeds) after they have been picked from the plants. This can be done on drying racks in a conventional dehydrator or by vacuum drying means, or by any other means for drying known to the art of food and pharmaceutical processing. Low-temperature drying means (not to exceed about 140° F.) are greatly preferred. It is preferred that the moisture content of the dried mixture be no more than about 3–5% by weight.

The dried berries (containing seeds) are then milled to about 30 mesh. The berries are then subjected to an extraction process used to express oil from the seeds. This is accomplished by $CO_2$ super critical extraction, a means known to the art. Oil from the seeds in the berries is expressed during this process in an amount by weight of between 6% and 12% of the weight of the seeds. The pomace residue is gathered and milled to a mesh size of between about 60 to about 80.

The expressed oil and pomace are preferably mixed at a ratio ranging from 1:3 (oil to pomace) to 1:6 (wt/wt). The oil and pomace are then combined in a batching vessel. Additional nutritional and/or nutraceutical substances from the group consisting of vitamins, minerals, herbs and the like, may be added during the mixing stage. The ratio of oil to pomace is established prior to the addition of any further ingredients.

The oil and pomace and any additives are thereupon thoroughly blended in a ribbon blender to ensure that the entire bulk of the pomace is contacted by the oil. Preferably, this blending is done at a temperature between about 40° F. and 75° F. The blending takes 3 to 5 hours for the oil to be completely saturated into the pomace.

The product so derived using saw-palmetto berries as the starting plant material is called SAW-MAX. It readily flows and can easily be packaged, transported, and formulated into dosage form (if desired). The powder is easily pelletized or capsulated using suitable and conventional machinery.

SAW-MAX powder is non-hygroscopic and therefore does not require the use of desiccants. It should also be noted here that the product formulated from any product similarly produced from another plant source in Category 2 is also non-hygroscopic and does not require the use of desiccants.

The composition described herein, whether from saw-palmetto or another similar plant source, either alone or in combination with other nutritionally significant compounds can be used in the formulation of dietary supplements, nutraceuticals or pharmaceutical compositions for nutritional and/or medical use. The composition may be optionally formulated with an acceptable carrier therefor and optionally other therapeutically active ingredients. The carrier, if one is utilized, must be pharmaceutically acceptable in the sense of being compatible with the other ingredients of the formulation and not deleterious to the recipient thereof.

The formulations are suitable for oral administration only. The formulations may conveniently be presented in unit dosage form and may be prepared by any of the methods well known in the art of pharmacy. All of the above methods described above under CRAN-MAX are similarly applicable in this case.

Another aspect of the invention, an all natural method of orally delivering nutraceutical products, has been given the name BIO-SHIELD, which term shall be used to designate the method described below.

The BIO-SHIELD method comprises using a composition produced using the method described above for producing CRAN-MAX or SAW-MAX, placing this composition into a capsule or tablet and then orally ingesting it.

Because the bioactive ingredients are infused into a fiber matrix, the bioactive components are shielded from degradation during transit through the stomach, thereby delivering a maximum concentration of bioactive ingredients into the intestines. The natural pectin components of the product slow down the digestive process in the intestines and provide a sustained release of the active compounds from the fiber matrix, thereby enhancing the bioavailability of the active compounds.

Another aspect of the invention is a highly concentrated, purified fiber product given the name FIBER-X, which term shall be used to designate the product described below. FIBER-X is produced from the pomace of any of the plants described herein, following removal of the juice or oil component. The fiber is rich in the bioactive compounds found in those plants and has value as a nutritional bulking agent.

Two different sequences are employed, depending upon whether the plant source is a Category 1 or Category 2 plant, as referenced above.

Where the plant source is a Category 1 plant, the extracted juice is discarded. The pomace remaining after pressing is thereupon dried and milled, using the same drying and milling methods and specifications as described above for CRAN-MAX.

Where the plant source is a Category 2 plant, the same drying, initial milling and extraction methods and specifications are the same as those described above under SAW-MAX. However, in this case the oil obtained from the extraction process is discarded. The pomace residue has a small amount (1–2% by weight) of oil contained within its fiber matrix, along with other bioactive compounds found naturally in the plant. The pomace is remilled again to a mesh of between about 60 and about 80.

The dried product so derived from either of these methods is called FIBER-X which is a 100% edible plant matter composition. In each case depending upon the plant material source utilized, the composition is a fiber product containing some of the particular bioactive values of that plant source.

FIBER-X can be used as a nutritional ingredient in place and instead of other highly concentrated, unpurified fiber products such as bran, gum or psyllium-seed husk. In bulk, the composition makes an excellent natural nutritional ingredient and can be used as a food additive for fortification of fiber bars, cereals, breads, drinks and the like.

Optionally, it can be presented in unit dosage form to promote and maintain a healthy life, pelleted, tableted or capsulated for use as a dietary supplement to be orally ingested.

The preferred composition comprises cranberry pomace, which is dried and blended with a gum or alternatively another water-soluble plant fiber and then milled to a roughly uniform size, and optionally formed into tablets or capsules, in the absence of any colorants, sweeteners, unnatural binders, excipients or any other accessory ingredient.

The composition has the same non-hygroscopic and flow features a described above in the second embodiment of the invention. In short, this composition is also comprised entirely of plant-derived fiber.

Another aspect of the invention is a nutraceutical tea, comprising the blend produced using the entire method described in CRAN-MAX above with the exception that the product produced is milled instead to a tea cut of between 12 and 16 mesh.

EXAMPLES

The following Examples are included solely to aid in a more complete understanding of the subject invention. The Examples do not limit the scope of the invention described herein in any fashion.

Example 1

Production of CRAN-MAX.

CRAN-MAX was produced by combining 1430 pounds cranberry fiber, 65% moisture content, with 99 gallons of cranberry juice concentrate (50 brix, 10.2 pounds per gallon), to yield a total weight of 2430 pounds. Both the cranberry fiber and the concentrate were delivered frozen and thawed immediately prior to formulation.

The fiber and concentrate were mixed thoroughly, whereby the concentrate was absorbed completely into the fiber. The mixture was then vacuum dried (final moisture 1.75%) and milled to 50 mesh. This yielded a free-flowing, non-hygroscopic powder formulation having a natural rose-colored hue.

Example 2
Production of CRAN-MAX Plus Vitamin C.

A batch of CRAN-MAX was prepared in the same fashion as described in Example 1 with the exception that 250 pounds of ascorbic acid (Vitamin C) was added to the concentrate prior to mixing the concentrate with the fiber. The ascorbic acid was added to the concentrate with continuous agitation, and this mixture then added to the fiber. The combination was thoroughly mixed, vacuum dried (1.75% final moisture), and milled to 50 mesh. The resultant product was also a free-flowing, non-hygroscopic powder having a natural rose-colored hue.

Example 3
Production of CRAN-MAX Using Cranberry Juice Concentrate of Varying Brix.

CRAN-MAX was produced using a 1 to 1 weight ratio of fiber to 50 brix juice concentrate. Wet fiber (396 g) having a moisture content of 63.84% by weight yielded a dry fiber weight of 143 grams. To the wet fiber was added 143 grams of 50 brix concentrate, which is equivalent to adding 0.157 pound juice solids to the fiber. The mixture was dried and milled as in Example 1.

To formulate an equivalent amount of CRAN-MAX using 65 brix concentrate, 110 g of concentrate was added to the same amount of fiber. The calculation appears as follows:

(amt of 65 brix concentrate)(7.135 pound solids @ 65 brix)=0.157

(amt of 65 brix concentrate)=0.022 gal=83.3 ml=110 g concentrate

Example 4
Comparison of ORGANIC ACID CONTENT IN CRAN-MAX V. CRANBERRY JUICE.

Samples of CRAN-MAX prepared as described in Example 1 and commercially purchased cranberry juice were analyzed by reverse phase HPLC using an organic acids column and UV detection means to determine the percentage of quinic, malic, and citric acids found therein. The results are presented in Table 1:

TABLE 1

| | Organic Acids (%)[a] | | | |
| Sample | Quinic | Malic | Citric | Total |
| --- | --- | --- | --- | --- |
| CRAN-MAX | 2.1 | 5.0 | 3.8 | 10.9[b] |
| Commercial Cranberry Juice | 1.6 | 6.8 | 2.7 | 11.1[c] |

[a]Values determined by reverse-phase HPLC with UV detection based on appropriate standard solutions.
[b]% w/w
[c]% w/v Example 5
Antioxidant Activity of CRAN-MAX A sample of CRAN-MAX produced according to Example 1 was analyzed for its oxygen-radical absorbance capacity (ORAC) using a standard assay.

The assay utilizes 2,2'-azobis(2-amidinopropane) dihydrochloride) (AADH) as a peroxyl radical generator and B phycoerythrin as an indicator protein. "TROLOX," a water-soluble Vitamin E analog, is used as a reference point for antioxidant activity. One ORAC Unit is defined as the oxygen-radical absorbance capacity of a 1 MM solution of "TROLOX." The assay is constructed by combining the phycoerythrin and the composition to be tested into an aqueous solution and then adding the AADH and monitoring the reaction solution by fluorescence at 565 nm (excitation at 540 nm).

Serial dilutions of CRAN-MAX, cranberry juice, and "TROLOX" were assembled and aliquots of phycoerythrin added thereto. The results are depicted in Table 2:

TABLE 2

| Sample | ORAC Units per g | "TROLOX" Equivalent |
| --- | --- | --- |
| Commercial Cranberry Juice Cocktail | 9,196 | 0.007 |
| CRAN-MAX | 26,227 | 0.020 |
| Trolox | 1,315,780 | 1.000 |

Example 6
Calculation of Weight Ratio: Whole Cranberry to CRAN-MAX

A 100 lb. sample of cranberries was juiced in standard fashion, yielding 5 pounds of cranberry fiber, a ratio of 20 to 1. One hundred pounds of whole cranberries will have an average yield of 1.25 gallons of juice concentrate at 50 brix and 10.24 lbs./gallon, which is equivalent to 12.8 lbs at 50 brix which is equivalent to 6.4 lbs dry solids. 6.4 lbs juice solids per 100 lbs whole cranberries yields a ratio of 15.6 to 1. Combining the juice solids with the cranberry fibers in the combined CRAN-MAX formulation thus yields a final ratio of 34.6 to 1. At this ratio, 500 mg CRAN-MAX contains the same juice solids as about 10 oz. of cranberry juice concentrate.

Example 7
Clinic Evaluations

Three patients in a urological practice were given a self-assessment questionnaire developed by the American Urological Association for assessing symptoms related to benign prostatic hypertrophy. The patients evaluated the questions on a scale of 0 to 5, 0 designating "none," "never," or "not at all" and 5 designating "5 or more times (in the stated period)" or "almost always." The 7 questions contained in the self-assessment questionnaire were:

1. Over the last month or so, how many times did you most typically get up to urinate from the time you went to bed at night until the time you got up in the morning?

2. Over the past month or so, how often have you had a sensation of not emptying your bladder completely after you finished urinating?

3. Over the past month or so, how often have you had to urinate again less than two hours after you finished urinating?

4. Over the past month of so, how often have you found that you stopped and started again several times when you urinated?

5. Over the past month or so, how often have you found it difficult to postpone urination?

6. Over the past month or so, how often have you had a weak urinary stream?

7. Over the past month or so, how often have you had to push or strain to begin urination?

Each of the three patients (two female, one male) completed the questionnaire and their scores tallied by adding the total numeric value of their responses. The results were as follows:

| Score of Self-Assessment at Beginning of Trial | |
| --- | --- |
| Patient 1 | 7.5 |
| Patient 2 | 9 |
| Patient 3 | 8 |

With full information and consent, each patient was then given a 500 mg daily dose of CRAN-MAX, in a single dose, for a course of 30 days. The patients then completed the self-assessment questionnaire. The scores after the 30 course of treatment with CRAN-MAX were as follows:

| Score of Self-Assessment After 30-Day Treatment Period | |
| --- | --- |
| Patient 1 | 2.5 |
| Patient 2 | 6 |
| Patient 3 | 3 |

Thus, for these three patients, treatment with CRAN-MAX over a course of 30 days resulted in a marked improvement of their self-assessment of urinary frequency, urgency, etc.

It is understood that the invention is not confined to the particular construction and arrangement of parts herein illustrated and described, but embraces such modified forms thereof as come within the scope of the claims.

What is claimed is:

1. A method of producing a dietary supplement from a vegetable, herb or spice plant material comprising:
   (a) expressing oil from the plant material thereby yielding an oil portion and a pomace portion;
   (b) mixing the oil portion with the pomace portion to yield an oil-infused pomace; and then
   (c) drying the oil-infused pomace to yield the dietary supplement.

2. The method of claim 1, further comprising, prior to step (a), drying the plant material.

3. The method of claim 2, wherein the plant material is dried at a temperature of less than about 140° F.

4. The method of claim 2, wherein the plant material is dried to a moisture content no more than about 3–5% by weight.

5. The method of claim 1, further comprising, after the drying, milling the plant material to about 30 mesh.

6. The method of claim 1, further comprising, prior to step (b), milling the pomace to a mesh size between about 60 and about 80.

7. The method of claim 1, wherein in step (b), the oil portion is mixed with the pomace portion at a temperature between about 40° F. and 75° F.

8. The method of claim 1, wherein in step (b), the oil portion is mixed with the pomace portion in an about 1:3 to 1:6 (wt/wt) oil portion to pomace ratio to yield oil-infused pomace.

9. The method of claim 1, further comprising, after the mixing, blending the oil-infused pomace in a ribbon blender.

10. The method of claim 1, further comprising adding additional nutritional and/or nutraceutical substances to the oil portion and the pomace portion in step (b).

11. The method of claim 1, wherein in step (c), the oil-infused pomace is dried to yield a free-flowing, non-hygroscopic powder formulation to yield the dietary supplement.

12. The method of claim 1, further comprising, after step (c):
   (d) comminuting the dietary supplement to a roughly uniform particle size.

13. The method of claim 12, wherein the dried product is comminuted to a mesh size between about 50 and about 80.

14. The method of claim 13, further comprising, after step (d):
   (e) formulating the dietary supplement into unit dosage form.

15. The method according to claim 1, wherein in step (a), oil is expressed from one or more plants selected from the group consisting of *Nigella sativa*, saw palmetto, Echinacea, and alfalfa.

16. A dietary supplement produced by the method recited in claim 15.

17. The dietary supplement of claim 16, which contains between about 50 and about 5000 mg of the dietary supplement in a unit dosage form.

18. The dietary supplement of claim 16, which contains between about 300 and about 1000 mg of the dietary supplement in a unit dosage form.

19. The dietary supplement of claim 16, which contains between about 500 mg of the dietary supplement in a unit dosage form.

20. A method of producing a dietary supplement comprising:
   (a) drying plant material;
   (b) milling the dried plant material to about 30 mesh;
   (c) expressing oil from dried plant material thereby yielding an oil portion and a pomace portion;
   (d) milling the pomace portion to a mesh size between about 60 and about 80 mesh;
   (e) mixing the oil portion with the pomace portion to yield a oil-infused pomace;
   (f) blending the oil-infused pomace; and then
   (g) drying the oil-infused pomace to yield the dietary supplement
   wherein in step (a), the plant material dried is from one or more plants selected from the group consisting of *Nigella saliva*, saw palmetto, Echinacea, and alfalfa.

21. A dietary supplement produced by the method recited in claim 20.

* * * * *